United States Patent
Maanoja et al.

(10) Patent No.: US 7,801,533 B2
(45) Date of Patent: Sep. 21, 2010

(54) LOCATION REQUEST CONTROL

(75) Inventors: Markus Maanoja, Helsinki (FI); Jan Kall, Esbo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/495,369

(22) PCT Filed: Nov. 19, 2002

(86) PCT No.: PCT/IB02/04830

§ 371 (c)(1),
(2), (4) Date: Jun. 22, 2004

(87) PCT Pub. No.: WO03/045101

PCT Pub. Date: May 30, 2003

(65) Prior Publication Data

US 2005/0020276 A1    Jan. 27, 2005

(30) Foreign Application Priority Data

Nov. 23, 2001    (GB) .................................. 0128155.9

(51) Int. Cl.
*H04W 24/00*    (2009.01)
(52) U.S. Cl. .............. 455/456.1; 455/456.2; 455/456.3; 455/456.4; 455/456.5; 455/456.6
(58) Field of Classification Search .............. 455/404.2, 455/456.1–456.6, 456.7, 414.1, 404.1, 457
See application file for complete search history.

(56) References Cited

U.S. PATENT DOCUMENTS

| 6,002,936 | A | * | 12/1999 | Roel-Ng et al. .......... 455/456.4 |
| 6,078,818 | A | * | 6/2000 | Kingdon et al. .......... 455/456.5 |
| 6,198,933 | B1 | * | 3/2001 | Lundin .................... 455/456.4 |
| 6,295,454 | B1 | | 9/2001 | Havinis et al. |
| 6,385,458 | B1 | * | 5/2002 | Papadimitriou et al. ... 455/456.2 |
| 6,463,289 | B1 | * | 10/2002 | Havinis et al. .......... 455/456.4 |
| 6,757,545 | B2 | * | 6/2004 | Nowak et al. ............ 455/456.2 |
| 7,054,648 | B2 | * | 5/2006 | Abtin et al. ............. 455/456.2 |
| 7,280,822 | B2 | * | 10/2007 | Fraccaroli ................ 455/414.3 |
| 2004/0058688 | A1 | * | 3/2004 | Silver et al. ................ 455/456 |
| 2004/0102195 | A1 | * | 5/2004 | Naghian et al. .......... 455/456.1 |
| 2004/0185865 | A1 | * | 9/2004 | Maanoja .................. 455/452.2 |
| 2006/0030334 | A1 | * | 2/2006 | Hashimoto ............... 455/456.1 |

FOREIGN PATENT DOCUMENTS

WO    WO169951 A1 *    3/2001
WO    WO 01/69951 A1    9/2001

OTHER PUBLICATIONS

Extended European Search Report for corresponding European Patent Application No. 09157538.1 dated Jul. 3, 2009, pp. 1-8.
Office Action for corresponding European Patent Application No. 09157538.1 dated Feb. 10, 2010, pp. 1.

* cited by examiner

*Primary Examiner*—Charles N Appiah
*Assistant Examiner*—Olumide T Ajibade Akonai
(74) *Attorney, Agent, or Firm*—Ditthavong Mori & Steiner, P.C.

(57) ABSTRACT

There is disclosed a method and system for providing location services in a mobile wireless network between a user and a location services provider, wherein the control point of periodic location requests is dynamically allocated to one of a plurality of network elements.

25 Claims, 1 Drawing Sheet

LOCATION REQUEST CONTROL

FIELD OF THE INVENTION

The present invention relates to location services in mobile wireless networks.

BACKGROUND OF THE INVENTION

Location services are known in mobile wireless networks particularly for providing location based information to users of the network. Certain location based information services rely upon the periodic provision of a user's location.

Traffic and navigation applications are two typical examples of location services utilising periodic location updates. For example in traffic guidance applications, e.g. finding optimal road routes, and fleet management, e.g. taxi or delivery services, the provision of location-based information is an essential part of content offering.

Such periodic location based services are typically based on essentially constant updates of location information. In navigation applications the location of the user must be updated frequently otherwise the road assistance, e.g. 'turn left at next junction') is not accurate or useful. Similarly in fleet management the update period is typically in the region of ten's of seconds or minutes depending on the application, and therefore updates are very frequent.

Some periodic tracking applications, however, have relatively long periods between location updates. For example child tracking or business user tracking are examples where the update period may be hours or even days.

Current location services (LCS) specifications offer very limited control possibilities for this sort of periodic positioning. In practice only single requests are supported. No account is taken of the type of location services required.

In addition in most scenarios producing single requests causes excessive signalling within the network resources, and thereby results in poor resource usage.

Embodiments of the present invention aim to address one or more of the above problems and to provide an improved location update request control.

SUMMARY OF THE INVENTION

Statement of Invention to Follow when Claims Agreed Upon.

BRIEF DESCRIPTION OF DRAWINGS

For better understanding of the present invention, and to show as to how the same may be carried into effect, reference will now be made by way of example to the accompanying drawings in which.

DESCRIPTION OF PREFERRED EMBODIMENTS OF THE INVENTION

The present invention is described hereinafter with reference to a particular set of embodiments. However the invention is not limited to such embodiments. The invention is particularly described by way of reference to a particular wireless mobile network arrangement.

Figure 1:
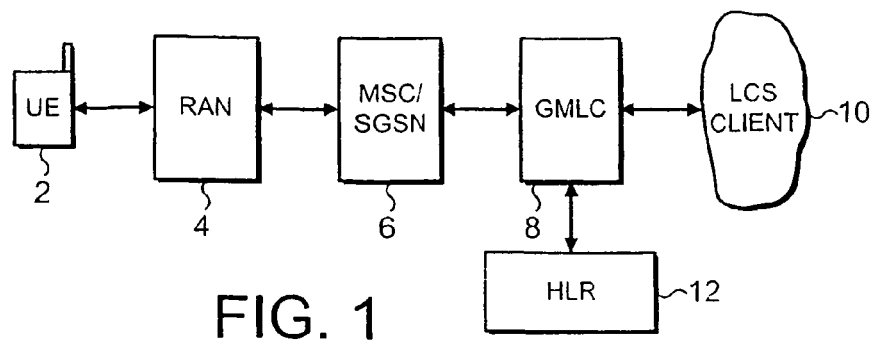
FIG. 1 illustrates a block diagram of a wireless radio network supporting location services.

Referring to FIG. 1 there is illustrated an exemplary wireless mobile network arrangement. There is shown a wireless user represented by a mobile telephone (user equipment), designated by reference 2; a radio access network (RAN) designated by reference numeral 4; a mobile switching centre (MSC) or serving GPRS support node (SGSN) designated by reference numeral 6; a gateway mobile location centre (GMLC) 8; a location service (LCS) client 10; and a home location register (HLR) 12. The MSC/SGSN 6, the GMLC 8 and the HLR 12 all form part of the core network.

The implementation of the various blocks of FIG. 1 is outside the scope of the present invention, and for the purposes of the discussion of the present invention it is assumed they operate in accordance with standard, known techniques except where stated. The MSC/SGSN block 6 will be implemented as an MSC or SGSN block in dependence on whether the network is a GSM network or a GPRS network respectively.

The home location register is a database which stores the user's service profile. This profile may include, for example, information on allowed services and the UE location on the MSC/SGSN level. The MSC serves the UE in its current location for circuit switched transactions. The SGSN serves the UE for packet switched transactions. The GMLC is the switch point at which the LCS client is connected to the core network. All incoming and outgoing connections to/from the LCS client go through the GMLC. All elements of the core network shown, i.e. the MSC/SGSN and the GMLC, have connections to the HLR.

The user equipment is shown to be a mobile telephone 2 in this example. However the user equipment may be any other type of wireless device equipped with technology for interfacing with the wireless network. The LCS client 10 is a location services provider. The services of the LCS client may be accessed by the user owning or using the user equipment 2 through the wireless network.

In accordance with the present invention, the periodic location update control is dynamically allocated to different elements of the network shown in FIG. 1. In practice, as discussed hereinbelow, this means that a control mechanism is introduced such that periodic location requests are handled by different network elements in dependence on other network or service factors. Such factors may include, for example, the location update quality of service (QoS), the periodic interval required for the location updates, and the time over which the periodic location updates will be required. Other parameters may also be used to control the dynamic allocation of the periodic location update.

Figure 2:
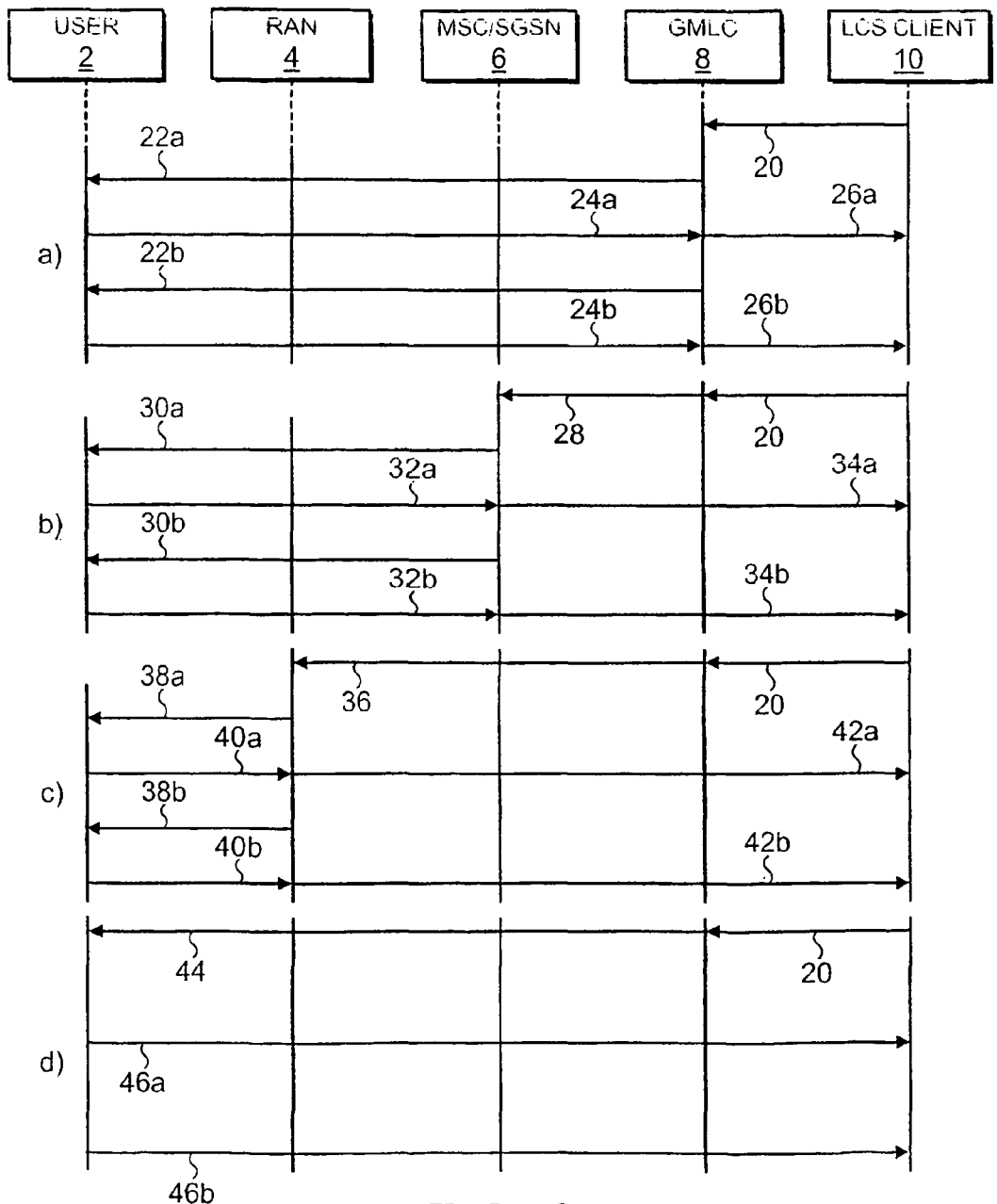
FIG. 2 illustrates exemplary communications between the elements of FIG. 1 in accordance with embodiments of the invention.

With reference to FIG. 2, the present invention will be further described by way of reference to the control being allocated to various ones of the network elements of FIG. 1. As such, four different location update control elements are described.

The purpose of the Figures is to illustrate the dynamic control environment of the present invention. The signalling content of periodic location update requests and replies is not affected by the present invention, and as such the content of such signalling is not discussed. It is assumed herein that such signalling is in accordance with techniques known in the art. The formulation of location estimates, and location estimate responses, are not discussed herein.

In practice, the selected control network element initiates periodic location requests (in the downlink) as discussed hereinafter, and sends the resulting periodic location reports (in the uplink), towards the GMLC and the LCS client. The implications of the four alternatives of FIG. 1 are described below.

For the purposes of the embodiments described herein with reference to FIG. 2, it is assumed that the location information is obtained based on measurements carried out in the user equipment. However one skilled in the art will appreciate that in certain implementations it may be satisfactory to rely upon measurements available in the RAN.

The present invention proposes that the gateway of the core network, in this example the GMLC, preferably chooses which network element is the preferred location for periodic location update control for every periodic location request received from the LCS client. The basis on which the GMLC makes such choice is discussed further hereinafter.

In the first alternative it is proposed that the location update periodic control is handled in the GMLC 8 of the core network. In this example the LCS client requests periodic positioning from the GMLC by sending a signal to the GMLC as represented by arrow 20. The request from the LCS client includes the identification of the period with which location updates are required, and the duration for which location updates should be provided. As is further discussed hereinbelow, in a first step the GMLC 8 determines which of the various network elements should control the location updates.

In the example of FIG. 2(*a*), it is assumed that the GMLC determined that it should be responsible for the control of the location updates. At the appropriate periodic intervals, the GMLC sends a location update request to the user 2 as represented by arrows 22. These requests are passed to the user via the MSC/SGSN 6 and the RAN 4. Responsive to these requests 22 the user provides replies to the GMLC as represented by arrows 24, which are forwarded to the LCS client as represented by arrows 26. The GMLC 8 then continues to initiates individual single LCS requests to the telecom network within the desired time intervals.

The scenario illustrated with reference to FIG. 2(*a*) represents a conventional arrangement for location update request control. In conventional, known systems, such control is always provided in the GMLC 8, or more generally in the gateway of the core network.

This conventional arrangement requires normal LCS request resources for all single LCS requests 22 made by the GMLC, for example routing, screening, privacy checks, paging, etc. The GMLC contacts the HLR 12 for every periodic request, and this may overload the HLR if the periodic interval is very short, or if there are many clients that request periodic reports.

All of these resources are freed after the single requests, i.e. there is no need to keep any dedicated signalling channels for later requests.

In the second alternative it is proposed that the location update periodic control is handled in the MSC/SGSN 6. In this example the LCS client requests periodic location information from the GMLC by sending a signal to the GMLC as represented by arrow 20. The request from the LCS client includes the identification of the necessary information concerning the location updates to be used for location update control. The GMLC 8 uses this information to determine which of the various network elements should control the location updates.

In the example of FIG. 2(*b*), it is assumed that the GMLC 8 determined that the MSC/SGSN 6 should be responsible for the control of the location updates, and consequently forwards the request for periodic location information to the MSC/SGSN 6 as represented by arrow 28. At the appropriate periodic intervals, the MSC/SGSN 6 sends a location update request to the user 2 as represented by arrows 30. These requests are passed to the user via the RAN 4. Responsive to these requests 30 the user provides replies to the MSC/SGSN 6 as represented by arrows 32, which are forwarded to the GMLC 8 and then the LCS client as represented by arrows 34. The MSC/SGSN 6 then continues to initiate individual single LCS requests to the user within the desired time intervals.

In the embodiment described with reference to FIG. 2(*b*), the periodic request is terminated at the MSC/SGSN, which then initiates multiple single request with required intervals.

In this case example there is no need to make LCS request screening, user privacy checks or routing request from the HLR, after the GMLC carries out such functions initially on receipt of the LCS request. In this respect it should be noted that access to the HLR is probably the biggest bottleneck in the LCS architecture and avoiding such access greatly improves efficiency of resource allocation. However, there is a need for paging and message sending to the RAN, and in this example the UE, depending on where the location calculation is taken place.

In this embodiment of the invention there are further proposed two ways to develop the signalling between the GMLC and the MSC/SGSN to support periodic location handling in the MSC/SGSN and to support MSC/SGSN sending periodic location reports to the GMLC. The first proposed alternative is to enhance the existing and standardised dedicated signalling channel (MAP transactions). The second alternative is to develop connectionless TCAP procedures, which may require adaptation of the current standards and hence further standardisation.

In this embodiment there may be required a new process to transfer LCS control between MSC/SGSNs in inter-MSC handovers. Alternatively, the LCS process could be released in the original MSC, and then may be re-initiated in the new MSC by the GMLC, in the case of inter-MSC handovers.

In the third alternative it is proposed that the location update periodic control is handled in the RAN 4, e.g. in the base station controller (BSC) or in the radio network controller (RNC). In this example the LCS service requests periodic location information from the GMLC by sending a signal to the GMLC as represented by arrow 20. The request from the LCS client includes the identification of the necessary information concerning the location updates to be used for location update control. The GMLC 8 uses this information to determine which of the various network elements should control the location updates.

In the example of FIG. 2(*c*), it is assumed that the GMLC 8 determined that the RAN 4 should be responsible for the control of the location updates, and consequently forwards the request for periodic location information to the RAN 4, via the MSC/SGSN 6, as represented by arrow 36. At the appropriate periodic intervals, the RAN 4 sends a location update request to the user 2 as represented by arrows 38. Responsive to these requests 38 the user provides replies to the RAN 4 as represented by arrows 40, which are forwarded to the MSC/SGSN 6, the GMLC 8 and then the LCS client as represented by arrows 42. The RAN 4 then continues to initiate individual single LCS requests to the user within the desired time intervals.

Hence in this embodiment the periodic request is routed to the radio access network 4 which then calculates the location of the user with the help of the user equipment, as illustrated in FIG. 2(*c*).

However in an alternative arrangement the location of the user may be determined in the RAN by using the local information available in the RAN itself. If the terminal measurements/calculation are needed then these are requested with the required time intervals from the user equipment as discussed hereinabove with reference to FIG. 2(*c*).

The provision of the location update control in the RAN optimises most of the LCS request procedures, leaving only terminal communication and actual position calculation for periodic control.

In this embodiment of the invention it is proposed that there is provided a dedicated signalling path between the GMLC, the MSC/SGSN, and the RNC/BSC to support periodic location handling in the RNC/BSC of the RAN and to support the RNC/BSC sending periodic location reports.

This embodiment may require a process to transfer LCS control between radio network controllers in case of inter-BSC/RNC handover. Alternatively this may be handled by the MSC/SGSN.

In the fourth alternative it is proposed that the location update periodic control is handled in the user equipment 2, e.g. in a mobile telephone. In this example the LCS service again requests periodic location information from the GMLC by sending a signal to the GMLC as represented by arrow 20. The request from the LCS client includes the identification of the necessary information concerning the location updates to be used for location update control. The GMLC 8 uses this information to determine which of the various network elements should control the location updates.

In the example of FIG. 2(*d*), it is assumed that the GMLC 8 determined that the user equipment 2 should be responsible for the control of the location updates, and consequently forwards the request for periodic location information to the user equipment 2, via the MSC/SGSN 6 and the RAN 4, as represented by arrow 44. At the appropriate periodic intervals, the user equipment provides location information to the LCS client via the RAN 4, the MSC/SGSN 6 and the GMLC 8. The user equipment 2 then continues to initiate individual single LCS replies to the LCS client within the desired time intervals.

In this embodiment the user equipment itself calculates it's own position and sends the periodic location reports. This optimises all the LCS procedures, leaving only the UE based position calculation to the UE itself.

This embodiment can be handled, for example, by an application in the UE which is in contact directly with the LCS client. This requires a dedicated signalling connection between the UE and LCS client to report position estimates. With this embodiment the standardized application interface for location services being developed in the LIF industry forum may be enhanced to support periodic location calculation in the UE and to enable the UE to send periodic location reports to the LCS client or to any other server.

With this embodiment an alternative to the above solution is to enable the GMLC to request the MSC/SGSN to request the UE to perform periodic positioning and to send the periodic location reports to the MSC/SGSN, the GMLC, and the LCS client. This solution requires changes in the MAP and LCS signalling standards being developed in 3GPP for Mobile terminated location request.

In this embodiment handovers are handled automatically because the signalling channel is "moving" with the terminal.

The implementation of the GMLC 8 in order to select the appropriate network element for controlling the periodic location updates may be implementation dependent.

In one arrangement all (or only selected) network elements are simultaneously available and selectable to perform the periodic location request control. The element selection can be configured based on a number of possibilities, for example, the operator's business logic, network load etc. Examples are discussed hereinbelow.

For location requests with very long calculation periods (e.g. hours or days) the control may be preferably implemented in the GMLC. In this case there is no benefit in optimising the LCS request procedures over dedicated signalling channel between the GMLC and the MSC in the RAN. In practice this channel reserves more resources than would performing all the procedures once a day, for example.

For location requests with very short time intervals (e.g. seconds) the control may be best handled in the RAN or the UE. The telecom network would be enormously loaded if all normal LCS procedures would have to be performed as requested by GMLC at this periodic interval. The invention enables minimisation of the resources reserved for periodic location reports in every network element.

For location requests in which the time period is relatively short, but where the required accuracy is very low, it may be preferable to calculate the position based on information already in GMLC (using history data, MSC area, etc). Therefore in this case it is most feasible to have GMLC control the periodic reports.

For location requests in cases where the requested interval is relatively long, but where the QoS requirement is high and the overall time for periodic control is short, it may be preferable to handle the request in the RAN or in the UE.

It should be also noted that wherever the periodic update requests are controlled it is preferable to be able to release or stop the process. This may be required either by an LCS client request (LCS periodic location update release) or because the user profile has changed (privacy profile may be changing according to the time of day). The invention thus provides for these procedures for release control and enhancements to user privacy control.

It should be noted that handling optimisation is based on the fact that complexity of LCS signalling is related to LCS request handling. Therefore in this invention the request direction (from LCS client to calculation entity) is optimised, the response direction (location coordinate response from calculation entity to LCS client) is reporting all the results periodically.

The present invention thereby introduces a system that enables periodic location requests and their handling in the most optimal elements of the network according to location quality of service and calculation period.

The present invention has been described herein by way of reference to specific, non-limiting examples. It should be understood that the invention is more generally applicable than the examples given herein. One skilled in the art will understand the broader applicability of the present invention. The scope of the invention is defined by the appended claims.

The invention claimed is:

1. A method, comprising:
    dynamically allocating a control point for a location service request to one of a plurality of network elements within a mobile wireless network, the control point being dynamically allocated in dependence on characteristics of the location service request for periodically updating location information for a respective one of location services within the mobile wireless network between a user equipment and a location services provider.

2. A method according to claim 1, wherein the plurality of network elements include at least one of a user equipment, an element of a radio access network, and an element of a core network.

3. A method according to claim 1, wherein the dynamic allocation of the control point is carried out by a core network.

4. A method according to claim 3, wherein the dynamic allocation of the control point is carried out by a gateway of the core network.

5. A method according to claim 1, wherein the characteristics include at least one of a quality of service level to be supported, a periodic interval of the location updates, a current network load, and an operator business logic.

6. A method according to claim 1, wherein the plurality of network elements includes a gateway of a core network.

7. A method according to claim 6, wherein the gateway is a gateway mobile location center.

8. A method according to claim 1, wherein the network is a packet switched network and the plurality of network elements includes a serving general packet radio service support node.

9. A method according to claim 1, wherein the network is a circuit switched network and the plurality of network elements includes a mobile switching center.

10. A system, comprising:
   at least a radio access network;
   a core network;
   a location services provider; and
   an allocator configured to dynamically allocate the control point for a location service request to one of a plurality of network elements, wherein the mobile wireless network supports location services, the control point being dynamically allocated in dependence on characteristics of the location service request; and
   said control point configured to initiate periodic location requests for updates of location information for a respective one of said location services, in response to the location service request.

11. A system, comprising:
   an apparatus configured to provide location services in a mobile wireless network between a user equipment and a location services provider; and
   an allocator configured to dynamically allocate a control point for a location service request to one of a plurality of network elements, the control point being dynamically allocated in dependence on characteristics of the location service request, and said control point being configured to initiate periodic location requests for updates of location information for a respective one of said location services, in response to the location service request.

12. An apparatus, comprising:
   at least one processor; and
   at least one memory including computer program code,
   the at least one memory and the computer program code configured to, with the at least one processor, cause the apparatus to perform at least the following,
   dynamically allocate a control point for a location service request to one of a plurality of network elements within a mobile wireless network, the control point being dynamically allocated in dependence on characteristics of the location service request for periodically updating location information for a respective one of location services within the mobile wireless network, and the mobile wireless network comprising a radio access network, a core network, a location services provider, and the apparatus,
   wherein the mobile wireless network supports the location services.

13. The apparatus according to claim 12, wherein the apparatus is within a network element of the core network.

14. The apparatus according to claim 13, wherein said network element is a gateway of the core network.

15. The apparatus according to claim 14, wherein said gateway is a gateway mobile location center.

16. The apparatus according to claim 12, wherein the plurality of network elements include at least one of a user equipment, an element of the radio access network, and an element of the core network.

17. The apparatus according to claim 16, wherein the mobile wireless network is a packet switched mobile wireless network, and the element of the radio access network is a serving general packet radio service support node.

18. The apparatus according to claim 16, wherein the mobile wireless network is a circuit switched mobile wireless network, and the element of the radio access network is a mobile switching center.

19. The apparatus according to claim 16, wherein the element of the core network is a gateway element.

20. A method, comprising:
   dynamically allocating by an allocator a control point for at least one periodic location service request to one of a plurality of network elements, the control point being dynamically allocated in dependence on characteristics of the location service request and wherein the allocator operates in a mobile wireless network comprising a radio access network, core network, a location services provider, and the allocator, and
   wherein the mobile wireless network supports location services.

21. A method, comprising:
   providing location services in a mobile wireless network between a user equipment and a location services provider; and
   dynamically allocating a control point for a location service request to one of a plurality of network elements, wherein the dynamic allocation of the control point is carried out by a core network.

22. An apparatus, comprising:
   an allocator configured to dynamically allocate a control point for a location service request to one of a plurality of network elements in a mobile wireless network comprising a radio access network, core network, a location services provider, and the allocator comprising a network element of the core network,
   wherein the mobile wireless network supports location services.

23. A method, comprising:
   providing by an apparatus location services in a mobile wireless network between a user equipment and a location services provider;
   dynamically allocating by an allocator a control point for a location service request to one of a plurality of network elements; and
   initiating by said control point periodic location requests for updates of location information for a respective one of said location services, in response to the location service request.

24. An apparatus, comprising:
   an allocator configured to dynamically allocate a control point for a location service request to one of a plurality of network elements, wherein said control point is configured to initiate periodic location requests for updates of location information for a respective one of location services, in response to the location service request, and wherein the allocator is configured to operate in a mobile wireless network comprising a radio access network, core network, a location services provider, and the allocator, and
   wherein the mobile wireless network supports location services.

25. A computer readable storage medium carrying one or more sequences of one or more instructions which, when executed by one or more processors, cause an apparatus to at least perform the following steps:

dynamically allocating a control point for a location service request to one of a plurality of network elements within a mobile wireless network, the control point being dynamically allocated in dependence on characteristics of the location service request for periodically updating location information for a respective one of location services within the mobile wireless network between a user equipment and a location services provider.

* * * * *